United States Patent
Hansson et al.

(10) Patent No.: US 7,542,818 B2
(45) Date of Patent: *Jun. 2, 2009

(54) PROCESS FOR ACHIEVING DECOR ON SURFACE ELEMENTS

(75) Inventors: Krister Hansson, Trelleborg (SE); Johan Lundgren, Malmo (SE); Hakan Wernersson, Lund (SE)

(73) Assignee: Pergo (Europe) AB, Trelleborg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 11/354,913

(22) Filed: Feb. 16, 2006

(65) Prior Publication Data

US 2006/0136083 A1    Jun. 22, 2006

Related U.S. Application Data

(63) Continuation of application No. 09/718,380, filed on Nov. 24, 2000, now Pat. No. 7,003,364.

(30) Foreign Application Priority Data

Dec. 23, 1999   (SE) .................................. 9904781

(51) Int. Cl.
*G06F 19/00* (2006.01)
(52) U.S. Cl. .......................... 700/98; 700/122
(58) Field of Classification Search .............. 700/98, 700/122; 52/589.1; 428/195.1
See application file for complete search history.

(56) References Cited

U.S. PATENT DOCUMENTS

| | | | |
|---|---|---|---|
| 3,672,926 A | 6/1972 | Ramey | |
| 4,557,778 A | 12/1985 | Held | |
| 4,678,702 A | 7/1987 | Lancaster et al. | |
| 5,443,680 A | 8/1995 | Gerber | |
| 5,568,391 A | 10/1996 | Mckee | |
| 5,570,292 A * | 10/1996 | Abraham et al. | 700/157 |
| 5,744,220 A | 4/1998 | Ringo | |
| 5,797,237 A * | 8/1998 | Finkell, Jr. | 52/589.1 |
| 5,966,454 A | 10/1999 | Thomas | |
| 6,006,486 A * | 12/1999 | Moriau et al. | 52/589.1 |
| 6,119,423 A * | 9/2000 | Costantino | 52/390 |
| 6,132,883 A | 10/2000 | McGrath et al. | |
| 6,203,879 B1 | 3/2001 | Desai | |

(Continued)

FOREIGN PATENT DOCUMENTS

DE    10146304    4/2003

(Continued)

*Primary Examiner*—Albert DeCady
*Assistant Examiner*—Steven R Garland
(74) *Attorney, Agent, or Firm*—Novak Druce & Quigg LLP

(57) ABSTRACT

A process for achieving décor on surface elements (1) which comprises a decorative upper layer (2) and a supporting core (5). A selected main décor is entered via a terminal, the selected décor emanating from the group consisting of; an archetype digitized via digital camera or scanner and a digitized décor from a database. The dimensions of the surface to be covered by surface elements (1) and the desired dimension of the décor is entered into the terminal. Support programs is then used for calculating the segmentation of the main décor to cover more than one surface element. The result of the selections and calculations is visualised via the terminal.

4 Claims, 1 Drawing Sheet

U.S. PATENT DOCUMENTS

| | | |
|---|---|---|
| 6,354,212 B1 | 3/2002 | Krinsky |
| 6,401,415 B1 * | 6/2002 | Garcia ..................... 52/311.1 |
| 6,465,046 B1 * | 10/2002 | Hansson et al. ............ 427/256 |
| 6,504,559 B1 | 1/2003 | Newton |
| 6,617,009 B1 * | 9/2003 | Chen et al. ............... 428/195.1 |
| 6,685,993 B1 | 2/2004 | Hansson et al. |
| 6,888,147 B1 | 5/2005 | Hansson et al. |
| 6,991,830 B1 | 1/2006 | Hansson et al. |
| 7,003,364 B1 * | 2/2006 | Hansson et al. ............... 700/98 |
| 7,255,040 B2 | 8/2007 | Sjoberg |
| 2002/0034607 A1 | 3/2002 | Stoyles |
| 2003/0159385 A1 | 8/2003 | Thiers |
| 2003/0205012 A1 | 11/2003 | Garcia |
| 2004/0170812 A1 | 9/2004 | Sjoberg |
| 2005/0144898 A1 | 7/2005 | Sjoberg |
| 2005/0281993 A1 | 12/2005 | Hansson et al. |
| 2007/0079925 A1 | 4/2007 | Hansson et al. |

FOREIGN PATENT DOCUMENTS

| | | |
|---|---|---|
| EP | 1 153 736 A1 | 11/2001 |
| GB | 1407052 | 9/1975 |
| GB | 1472629 | 5/1977 |
| GB | 2088280 | 6/1982 |
| SE | 512210 | 2/2000 |
| WO | 9731775 | 9/1997 |
| WO | 9731776 | 9/1997 |

* cited by examiner

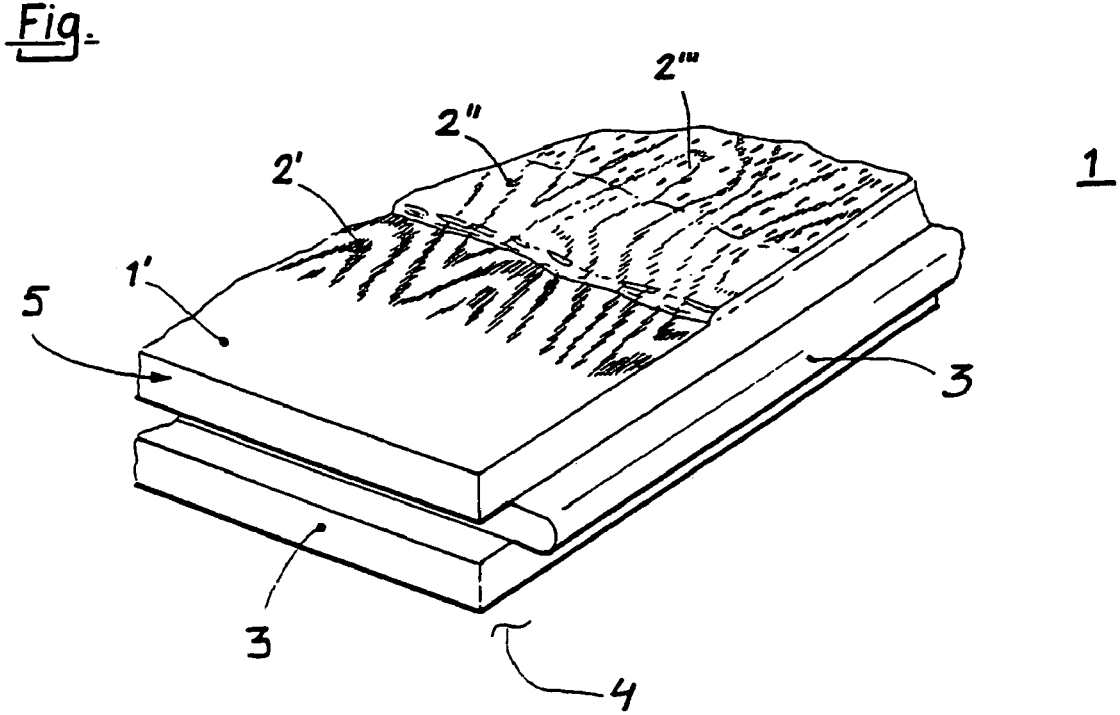

PROCESS FOR ACHIEVING DECOR ON SURFACE ELEMENTS

This application is a continuation application of U.S. application Ser. No. 09/718,380, filed Nov. 24, 2000, now U.S. Pat. No. 7,003,364 claiming the priority of Swedish Application Ser. No. 9904781-3, filed Dec. 23, 1999, the entire disclosures of which are incorporated herein by reference in their entireties.

The present invention relates to a process for achieving decor on surface elements having a decorative upper surface of which a decorative element may overlap several surface elements and will have an considerably improved matching of the décor between adjacent surface elements.

Products clad with thermosetting laminate is common in many areas nowadays. They are mostly used where the demands on abrasion resistance are high, and furthermore where resistance to different chemicals and moisture is desired. As examples of such products floors, floor skirting, table tops, work tops and wall panels can be mentioned.

The thermosetting laminate most often consist of a number of base sheets with a decor sheet placed closest to the surface. The decor sheet can be provided with a pattern by desire. Common patterns usually visualise different kinds of wood or mineral such as marble and granite.

One common pattern on floor elements is the rod pattern where two or more rows of rods of, for example wood, is simulated in the décor.

The traditional thermosetting laminate manufacturing includes a number of steps which will result in a random matching tolerance of up to ±5 mm, which is considered to great. The steps included in the manufacturing of a laminate floor is; printing decor on a paper of α-cellulose, impregnating the decorative paper with melamine-formaldehyde resin, drying the decorative paper, laminating the decorative paper under heat and pressure together with similarly treated supporting papers, applying the decorative laminate on a carrier and finally sawing and milling the carrier to the desired format. All these steps in the manufacturing will cause a change in format on the decor paper. It will therefore be practically impossible to achieve a desired match of patterns between the elements of a without causing great amounts of wasted laminate. The thermosetting laminate is a rather costly part of a laminate floor.

It has, through the present invention, been made possible to overcome the above mentioned problems and a surface element with a decorative surface where the decorative pattern between different surface elements is matching has been obtained. The invention relates to a process for achieving décor on surface elements which comprises a decorative upper layer and a supporting core. The invention is characterised in that;

i) A selected main décor is entered via a terminal, the selected décor emanating from a group consisting of; an archetype digitized via digital camera or scanner and a digitized décor from a database.

ii) The dimensions of the surface to be covered by surface elements and the desired dimension of the décor is then entered into the terminal. Support programs are used for calculating the segmentation of the main décor to cover more than one surface element.

iii) The result of the selections and calculations is finally visualised via the terminal.

The digitized main décor is stored digitally in order to be used as a control function and original, together with control programs and selection parameters, when printing the décor.

It is, in order to enhance the decorative effect of some decor possible to select a surrounding décor. A décor effect in the border between the main décor and the surrounding décor is suitably also selected, the selection being made from the group; fading, sharp edge, sharp edge with shadow effect, jagged edge, jagged edge with shadow and surrounding inlay of other decor.

The surrounding décor is preferably processed as follows;

i) A segmentation pattern for the surrounding décor is selected. The segmentation comprising at least two décor segments on each surface element. The shape, as seen from above, of the surface element is preferably selected from the group; triangular, quadratic, rectangular, heptagonal, pentagonal and octagonal. The shape of the surface elements with surrounding décor and the shape of the surface elements which, of course, is selected so that they can be joined with each other. The shape of the segments is selected from the group triangular, quadratic, rectangular, heptagonal, pentagonal, octagonal, circular, elliptical, perturbed and irregular.

ii) A segment décor is then selected for each segment. The segment décor is selected from the group; digitized and simulated depiction of different kinds of wood, minerals and stone, different kinds of fabric, art work and fantasy based decor.

iii) Each selection is made on a terminal where the selections emanates from a data base. The selection is visualised via the terminal.

A décor effect in the border between the main décor and the surrounding décor is suitably selected. The selection is preferably made from the group; fading, sharp edge, sharp edge with shadow effect, jagged edge, jagged edge with shadow and surrounding inlay of other decor. Also this selection is made on the terminal.

The dimensions of the surface to be covered by surface elements is suitably entered into the terminal and support programs calculates an installation pattern. The installation pattern calculation is preferably used for printing an assembly instruction. The installation pattern calculation is according to one embodiment of the invention used for printing a miniaturised copy of the calculated installation with the selected pattern and decor. This print out may serve as an evaluation copy of the design before making decisions regarding the manufacturing.

The dimensions of the surface to be covered by surface elements is entered into the terminal. Support programs further calculates décor and segmentation pattern matching between the surface elements. The selections is preferably used, together with support programs for controlling further steps in the manufacturing procedure selected from the group; identification marking, positioning marking, packaging, lacquering, surface embossing, storing and delivery logistics. An algorithm is preferably used for guiding the positioning of the décor segments and segmentation pattern so that a décor segment from one surface element may continue on an adjoining surface element. The control program is then preferably used together with décor data and selection parameters for applying matching identification on the surface elements.

It is also possible to manufacture a designed larger surface without any decor segments larger than a surface element by utilising the process as described below.

i) A segmentation pattern is selected, the segmentation comprising at least two décor segments on each surface element. The shape, as seen from above, of the surface element is hereby selected from the group; triangular, quadratic, rectangular, heptagonal, pentagonal and octagonal while the shape of the segments is selected from the group triangular, quadratic, rectangular, heptagonal, pentagonal, octagonal, circular, elliptical, perturbed and irregular.

ii) A segment décor is then selected for each segment. The segment décor is selected from the group; digitized and simulated depiction of different kinds of wood, minerals and stone, different kinds of fabric, art work and fantasy based décor.

iii) Each selection is made on a terminal where the selections emanates from a data base and that the selection is visualised via the terminal.

The décor is preferably achieved by digitization of an actual archetype or by partly or completely being created in a digital media. The digitized décor is preferably stored digitally in order to be used as a control function and original, together with control programs and selection parameters, when printing the decor.

The dimensions of the surface to be covered by surface elements is suitably entered into the terminal and support programs calculates an installation pattern. The installation pattern calculation is suitably also used for printing an assembly instruction. In order to visualise the selection the installation pattern calculation is possibly used for printing a miniaturised copy of the calculated installation with the selected pattern and decor. The dimensions of the surface to be covered by surface elements is suitably entered into the terminal and that support programs further calculates décor and segmentation pattern matching between the surface elements.

The selections is preferably also used, together with support programs for controlling further steps in the manufacturing procedure selected from the group; identification marking, positioning marking, packaging, lacquering, surface embossing, storing and delivery logistics.

An algorithm is suitably used for guiding the positioning of the décor segments and segmentation pattern so that a décor segment from one surface element may continue on an adjoining surface element. The control program is suitably used, together with décor data and selection parameters, for applying matching identification on the surface elements.

The surface elements may be used as floor, wall or ceiling boards. The surface elements are suitably manufactured through the following process;

i) A supporting core with a desired format is manufactured and provided with an upper side and a lower side.

ii) The upper side of the supporting core is then provided with a décor, by for example printing. The décor is positioned after a predetermined fixing point on the supporting core.

iii) The upper side of the supporting core is then provided with a protecting, at least partly translucent, wear layer by for example spray coating, roller coating, curtain coating and immersion coating or by being provided with one or more sheets of α-cellulose impregnated with thermosetting resin or lacquer.

The décor is suitably achieved by digitization of an actual archetype or by partly or completely being created in a digital media. The digitized décor is stored digitally in order to be used as a control function and original, together with possible control programs, when printing the decor.

The décor may accordingly be obtained by making a high resolution or selected resolution digital picture of the desired decor. This is suitably made by means of a digital camera or scanner. The most common décor will of course be different kinds of wood and minerals like marble, as these probably will continue to be preferred surface decoration in home and public environments. It is, however, possible to depict anything that is visible. The digitized version of the décor is then edited to fit the size of the supporting core. It is also possible to rearrange the décor in many different ways, like changing colour tones, contrast, dividing the décor into smaller segments and adding other decorative elements. It is also possible to completely create the décor in a computer equipped for graphic design. It is possible to create a simulated décor so realistic that even a professional will have great problems in visually separating it from genuine material. This makes it possible to make for example floor boards with an almost perfect illusion of a rare kind of wood, like ebony or rose wood and still preserving trees under threat of extermination.

The digital décor is used together with guiding programs to control a printer. The printer may be of an electrostatic type or an inc-jet type printer. Most often the colours yellow, magenta, cyan and black will be sufficient for the printing process, but in some cases it might be advantageous to add white. Some colours are difficult to achieve using the colours yellow, magenta, cyan, black and white whereby the colours light magenta and light cyan may be added. It is also possible to add so called spot colours where specific colour tones are difficult to achieve or where only certain parts of the colour spectrum with intermixing shades is desired. The resolution needed is much depending on the décor that is to be simulated, but resolutions of 10-1500 dots per inch (dpi) is the practical range in which most decor will be printed. Under normal conditions a resolution of 300-800 dpi is sufficient when creating simulations of even very complex decorative patterns and still achieve a result that visually is very difficult to separate from the archetype without close and thorough inspection.

The digitally stored décor can also be used together with support programs when guiding other operations and procedures in the manufacturing process. Such steps in the operation may include procedures like identification marking, packaging, lacquering, surface embossing, storing and delivery logistics as well as assembly instructions.

It is advantageous to manufacture the supporting core in the desired end user format and to provide it with edges suited for joining before applying the décor and wear layer, since the amount of waste thereby is radically reduced. The décor matching tolerances will also be improved further by this procedure.

The main part of the supporting core is suitably constituted by a particle board or a fibre board. It is, however, possible to manufacture the core that at least partly consist of a polymer such as for example polyurethane or a polyolefin such as polyethylene, polypropylene or polybutene. A polymer based core can be achieved by being injection moulded or press moulded and can be given its shape by plastic moulding and does therefore not require any abrasive treatment. A polymer based core may except polymer also contain a filler in the form of a particle or fibre of organic or inorganic material, which besides the use a cost reducing material also will be used to modify the mechanical characteristics of the core. As an example of such suitable fillers can be mentioned; cellulose or wood particles, straw, starch, glass, lime, talcum, stone powder and sand. The mechanical characteristics that may be changed is for example viscosity, thermal coefficient of expansion, elasticity, density, fire resistance, moisture absorption capacity, acoustic properties, thermal conductivity, flexural and shearing strength as well as softening temperature.

The upper surface, i.e. the surface that is to be provided with decor, is suitably surface treated before the printing. Such surface treatment will then incorporate at least one of the steps, ground coating and sanding. It is also possible to provide the surface with a structure that matches the décor that is to be applied.

The translucent wear layer is suitably constituted by a UV- or electron beam curing lacquer such as an acrylic, epoxy, or maleimide lacquer. The wear layer is suitably applied in several steps with intermediate curing where the last one is a complete curing while the earlier ones are only partial. It will hereby be possible to achieve thick and plane layers. The wear layer suitably includes hard particles with an average particle size in the range 50 nm-150 µm. Larger particles, in the range 10 µm-150 µm, preferably in the range 30 µm-150 µm, is foremost used to achieve abrasion resistance while the smaller particles, in the range 50 nm-30 µm, preferably 50 nm-10 µm is used for achieving scratch resistance. The smaller particles is hereby used closest to the surface while the larger ones are distributed in the wear layer. The hard particles are suitably constituted of silicon carbide, silicon oxide, α-aluminium oxide and the like. The abrasion resistance is hereby increased substantially. Particles in the range 30 mm-150 mm can for example be sprinkled on still wet lacquer so that they at, least partly, becomes embedded in finished wear layer. It is therefore suitable to apply the wear layer in several steps with intermediate sprinkling stations where particles are added to the surface. The wear layer can hereafter be cured. It is also possible to mix smaller particles, normally particle sizes under 30 µm with a standard lacquer. Larger particles may be added if a gelling agent or the like is present. A lacquer with smaller particles is suitably used as top layer coatings, closer to the upper surface. The scratch resistance can be improved by sprinkling very small particles in the range 50 nm-1000 nm on the uppermost layer of lacquer. Also these, so called nano-particles, can be mixed with lacquer, which with is applied in a thin layer with a high particle content. These nano-particles may besides silicon carbide, silicon oxide and α-aluminium oxide also be constituted of diamond.

According to one embodiment of the invention, the translucent wear layer is constituted of one or more sheets of α-cellulose which are impregnated with melamine-formaldehyde resin. These sheets are joined with the core under heat and pressure whereby the resin cures. It is, also in this embodiment, possible to add hard particles with an average particle size in the range 50 nm-150 µm. Larger particles, in the range 10 µm-150 µm, preferably 30 µm-150 µm is foremost used to achieve abrasion resistance while the smaller of the particles, in the range 50 nm-30 µm, preferably 50 nm-10 µm, is used to achieve scratch resistance. The smaller particles is hereby used on, or very close to, the top surface while the larger particles may be distributed in the wear layer. Also here the particles advantageously are constituted of silicon carbide, silicon oxide, α-aluminium oxide, diamond or the like of which diamond, of cost reasons only is used as particles smaller than 1 µm. The sheets of α-cellulose is hereby suitably pressed together with the rest of the surface element in a continues belt press with two steel belts. The pressure in the press is hereby suitably 5-100 Bar, preferably 20-80 Bar. The temperature is suitably in the range 140-200° C., preferably 160-180° C. It is also possible to utilise a discontinuous process where a number of surface elements can be pressed in a so called multiple-opening press at the same time. The pressure is then normally 20-150 Bar, preferably 70-120 Bar, while the temperature suitably is 120-180° C., preferably 140-160° C.

The décor on the surface elements is suitably constituted by a number of decor segments with intermediate borders, which borders, on at least two opposite edges coincides with intended, adjacent surface elements.

It is also desirable to provide the surface elements with a surface structure intended to increase the realism of the décor of the surface elements. This is suitably achieved by positioning at least one surface structured matrix, forming at least one surface structure segment on a corresponding décor segment or number of décor segments on the decorated surface of the surface element in connection to the application of wear layer. This matrix is pressed towards the wear layer whereby this will receive a surface with structure that enhances the realism of the décor.

When simulating more complex patterns, like wood block chevron pattern or other décor with two or more divergent and oriented décor, it is suitable to use at least two structured matrixes which forms one structure segment each. The structure segment are here independent from each other in a structure point of view. The surface structure segments are intended to at least partly but preferably completely match the corresponding décor segments of the decor. The surface structure segments are accurately positioned on the décor side of the surface element in connection to the application of the wear layer, and is pressed onto this whereby the wear layer is provided with a surface structure where the orientation of the structure corresponds to the different directions in the decor.

One or more matrixes preferably forms the surface of one or more rollers. The surface element is then passed between the roller or rollers and counter stay rollers, with the décor side facing the structured rollers. The structured rollers are continuously or discontinuously pressed towards the décor surface of the surface element.

Rollers containing two or more matrixes, is suitably provided with a circumference adapted to the repetition frequency of change of direction in the decor.

It is also possible to apply the structure matrixes on the surface of a press belt. The surface element is then passed between the press belt and a press belt counter stay under continuous or discontinuous pressure between the structured press belt and the press belt counter stay.

It is, according to one alternative procedure, possible to have one or more matrixes form the structure surface of one or more static moulds which momentary is pressed towards the decorative side of the surface element.

According to one embodiment of the invention, particularly characteristic decor segments such as borderlines between simulated slabs, bars, blocks or the like and also knots, cracks, flaws and grain which is visually simulated in the decor, is stored as digital data. Said data is used for guiding automated engraving or pressing tools when providing said characteristic décor segments with a suitable surface structure, and that said engraving tool or pressing tool is synchronised via the predetermined fixing point on the surface element.

The process described in the present application, for manufacturing surface elements is very advantageous from a logistic point of view since the number of steps when achieving a new décor is radically reduced. It is, according to the present invention possible to use digitally created or stored data for directly printing the décor on a surface element by using a ink-jet printer or a photo-static printer. The so-called set up time will thereby be very short, whereby even very special customer requirements may be met at a reasonable cost. It is according to the present invention possible to manufacture, for example, a world map in very large format, stretching over a great number of surface elements without any disrupting deviations in décor matching, to mainly the same cost as bulk produced surface elements. Since the décor may be handled digitally all the way to the point of being applied to the surface of the core, set up times will be practically non-existent while at the same time a high degree of automation will be practicable. It is also possible to automatically provide the surface elements with identification and orientation marking which would make the installation of complex decor, like world maps in the example above, much easier. This has so far been impossible.

Surface elements manufactured as described above is suitably used as a floor covering material where the demands on stability and scratch and abrasion resistance is great. It is, according to the present invention, also possible to use the surface elements as wall and ceiling decorative material. It will however not be necessary to apply thick wear layer coatings in the latter cases as direct abrasion seldom occurs on such surfaces.

The invention is described further in connection to an enclosed figure, embodiment examples and schematic process descriptions showing different embodiments of the invention.

Accordingly, the figure shows parts of a surface element 1 which includes an upper decorative layer 2, edges 3 intended for joining, a lower side 4 and a supporting core 5. The process is initiated by manufacturing a supporting core 5 with a desired format and edges 3 intended for joining. The supporting core 5 is further provided with an upper side 1' suited for printing and a lower side 4. The upper side 1' of the supporting core 5 is then provided with a décor 2' by printing, utilising an inc-jet printer. The décor 2' is oriented after a predetermined fixing point on the supporting core 5. The upper side 1' of the supporting core 5 is then provided with a protecting translucent wear layer 2" through curtain coating. The supporting core 5 is constituted by particle board or fibre board. The translucent wear layer 2" is constituted by a UV-curing acrylic lacquer which is applied in several steps with intermediate curing, of which the last one is a complete curing while the earlier ones are only partial curing. The wear layer 2" also includes hard particles of α-aluminium oxide with an average particle size in the range 0,5 μm-150 μm.

A surface structured matrix is positioned and pressed towards the décor side of the surface element 1 before the final curing of the acrylic lacquer whereby the surface of the wear layer 2" receives a surface structure 2''' which enhances the realism of the décor 2'.

It is also possible to utilise two or more surface structured matrixes, each forming a structure segment, between which the structure is independent, which will make it possible to simulate the surface structure of, for example, wood block chevron pattern decor.

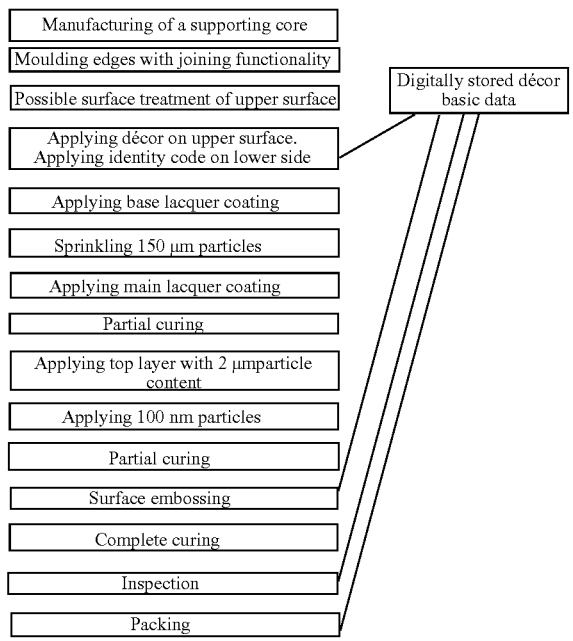

Process scheme 1.

A supporting polymer and filler based core is manufactured in the desired format and is provided with an upper side, a lower side and edges provided with joining members, such as tongue and groove. The upper side of the supporting core is then sanded smooth after which a primer is applied. A décor is then applied on the upper side by means of a digital photostatic five colour printer. The colours are magenta, yellow, cyan, white and black. The décor is positioned from a predetermined fixing point in form of a corner of the supporting core, while the décor direction is aligned with the long side edge initiating from the same corner.

The basis for the décor is stored as digital data. This digital data has been achieved by digitizing a number of wood grain patterns with a digital camera. A number of rectangular blocks with a fixed width, but of varying length is selected and parted from the digital wood grain pictures. The width of the rectangular blocks is selected so that three block widths equals the width of a supporting core. The digital image of the wood blocks are then classified after wood grain pattern and colour so that a number of groups is achieved. The groups are; fair wood with even grain, dark wood with even grain, fair wood with knots and flaws, dark wood with knots and flaws, fair cross-grained wood and finally dark cross-grained wood. Each group contains five different block simulations. An algorithm is feed into a computer which is used for the guiding of the printing operation so that the simulated wood blocks is digitally placed in three longitudinal rows and mixed so that two similar wood blocks never is placed next to each other. The algorithm will also guide the position of the latitudinal borderlines between the simulated wood blocks so that they are unaligned with more than one block width between adjacent rows. It will also guide the latitudinal position of the borderlines so that it either aligns with the shorter edges of the supporting core or is unaligned with more than one block width. Another printer, also guided by the computer, is utilised for printing a running matching number on the lower side short side edges. The décor will hereby continue longitudinally over the surface elements and a perfect matching is obtained when the surface elements are placed in numerical order.

A basic layer of UV-curing acrylic lacquer is then applied by means of a rollers. Particles with an average particle size in the range 150 μm is then sprinkled onto the still wet basic layer, whereby the main layer of UV-curing acrylic lacquer is applied by spray coating. The two layers of lacquer are then partly cured using UV-light whereby the viscosity of the lacquer increases. A top layer of UV-curing acrylic lacquer with an additive in the form of hard particles with an average size of 2 μm, is then applied by means of a roller. Hard particles with an average size of 100 nm is then sprinkled on top of the wet top layer, whereby the lacquer is partly cured with UV-light so that the viscosity increases. The still soft lacquer is then provided with a structure in the form of narrow, small, elongated recesses, simulating the pores of the wood. This will increase the realism of the decor. This is achieved by alternate between two different structured roller per row of simulated wood blocks. The structure of the rollers simulates even wood grain and cross-grained wood respectively. The rollers are alternately pressed towards the lacquered surface while it passes. The positioning of the rollers are guided via the digitally stored data used for printing the décor as well as the fixing point used there.

It is according to one alternative embodiment possible to utilise one or more static moulds with surface structure which momentary is pressed towards the décor side.

Especially characteristic décor segments such as borderlines between slabs, bars, blocks or the like and also knots, cracks, flaws and grain which is visually simulated in the décor, is suitably stored as digital data. This data is achieved by processing selected parts of the simulated wood blocks so that guiding data is achieved. Said data is then used for guiding an automated robot provided with an engraving tool or a press mould which provides the surface of the lacquer with a structure that matches said characteristic décor segments. The operation is also here synchronised via by the predetermined fixing point on the supporting core.

The lacquer is then completely cured with UV-light to desired strength, whereby the finished surface elements may be inspected by the naked eye or by a digital camera supported by a computer. The surface elements are then packed in batches and provided with identification markings.

The process above will make it possible to have a completely customer driven manufacturing where even very small quantities may be produced with the same efficiency as bulk manufacturing. Even though only one décor is described in connection to the process scheme above, it becomes clear to anyone skilled in the art, that a décor is changed very easily in the process. All of the important steps of the manufacturing such as printing, structuring, inspection, packaging and identification marking may be controlled and supervised by central processing data. This will make it logistically possible to manufacture customer designed décor. Such a process is exemplified as follows;

The customer utilises a database via Internet or at a local dealer. It is also possible for another operator utilise a database. The database contains samples and/or reduced resolution copies of a great variety of standard décor which can be combined after predetermined parameters.

The parameters may, for example, concern a single surface element where, for example, chevron pattern, diamond pattern and block pattern may be the choices of décor segmentation. It will here be possible to select a set of different simulations to randomly or by selected parameters fill the segments, for example, marble, birch and mahogany. The customer may also add an inlay from a design of his own which is digitized and processed, preferably automatically, to a desired format and resolution.

The parameters may alternatively include décor segments that requires the space of several surface elements, for example a map over the world. The parameters may here further include fading of the larger design to a surrounding decor, surrounding frame of other décor etc.

The customers enters the measurements of the surface that is to be covered by the surface elements. The customer then makes selections from the database and is able to see his selection as a completed surface, either on screen or by printing. The visualisation program used, is suitably also used for calculating installation pattern and presenting installation instructions with identification numbers on surface elements and where to cut the elements in order to make a perfect match. The surface elements may also be provided with removable matching lines on the decorative side making matching of décor between adjacent rows easier. The customer or dealer may then confirm his order via electronic mail where the pattern and décor is reduced to a code sequence and the order can be the direct input to the computer guiding the manufacturing process as described above. The customer and/or dealer data follows the manufacturing process all the way to packaging and a fully customer guided manufacturing process is achieved.

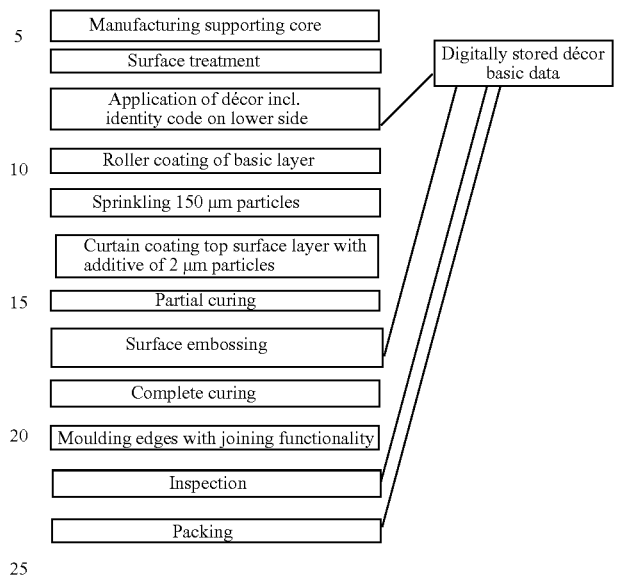

A supporting fibre board based core is manufactured in the desired format and is provided with an upper side, a lower side and edges. The upper side of the supporting core is then sanded smooth after which a white primer is applied. A décor is then applied on the upper side by means of a digital inc-jet four colour printer. The colours are magenta, yellow, cyan and black. The décor is positioned from a predetermined fixing point in form of a corner of the supporting core, while the décor direction is aligned with the long side edge initiating from the same corner.

The basis for the décor is stored as digital data. This digital data has been achieved by digitizing a number of wood grain patterns with a digital camera. A number of rectangular blocks with a fixed width, but of varying length are selected and parted from the digital wood grain pictures. The width of the rectangular blocks is selected so that three block widths equals the width of a finished surface element. The digital image of the wood blocks are then joined digitally to form a rectangular surface of a specified size, for example, 200× 1200 mm. A selected amount of such combinations of different blocks are designed as described above so that a number of slightly different rectangular surfaces is achieved. The printer, or preferably a set of printers are positioned so that a desired number of rectangular décor surfaces with a specified intermediate distance is printed on the supporting core. The intermediate distance between the rectangular surfaces is the distance needed for parting and moulding of edges. The décor printer or printers are also used for printing fixing points at predetermined positions. Another printer, also guided by the computer, is utilised for printing an identity code on the lower side of each intended finished surface element.

A basic layer of UV-curing acrylic lacquer is then applied by means of rollers. Particles with an average particle size in the range 150 μm is then sprinkled onto the still wet basic layer, whereby a top layer of UV-curing acrylic lacquer with an additive in the form of hard particles with an average size of 2 μm, is applied by means of a roller. Hard particles with an average size of 100 nm is then sprinkled on top of the wet top layer, whereby the lacquer is partly cured with UV-light so that the viscosity increases. The still soft lacquer is then provided with a structure in the form of narrow, small, elongated recesses, simulating the pores of the wood. This will increase the realism of the decor. This is achieved by pressing rollers towards the lacquered surface while it passes. The positioning of the rollers are guided via the digitally stored data used for printing the decor, as well as the fixing point used there when more complex and completely matching surface structures as described together with process scheme 1 is desired.

The lacquer is then completely cured with UV-light to desired strength, whereby the finished surface element is cut into the predetermined formats which are provided with edges with joining functionality are moulded by milling. The cutting and edge moulding process is positioned from fixing point printed close to the decor. The surface elements may then be inspected by the naked eye or by a digital camera supported by a computer. The surface elements are then packed in batches and provided with identification markings.

It is, according to an alternative procedure in the process, possible to cut and mould the edges at an earlier stage in the process. It is suitable to apply and cure a protecting layer of lacquer on top of the printed décor followed by cutting and moulding of the edges. The remaining and main part of the wear layer is then applied as described in connection to process scheme 1 or 2 above.

The process above will make it possible to have a customer initiated manufacturing where even very small quantities may be produced with the same efficiency as bulk manufacturing. Even though only one décor is described in connection to the process scheme above, it becomes clear anyone skilled in the art, that décor is changed very easily in the process. All of the important steps of the manufacturing such as printing, structuring, inspection, packaging and identification marking may be controlled and supervised by central processing data.

The invention is also described through embodiment examples.

EXAMPLE 1

A supporting core of medium density fibre board were sanded smooth. A layer of primer lacquer were applied on top of the fibre board. The primer were cured after which a decor was printed on top of the primer.

The build up of a wear layer was then initiated by applying 30 g/m$^2$ of UV-curing acrylic lacquer by means of roller coating. 20 g/m$^2$ of hard particles made of α-aluminium oxide with an average particle size of 70 μm were sprinkled on the still sticky lacquer. The lacquer was then exposed to a predetermined energy amount of UV-light so that it cured only partly and the viscosity was increased. Another 30 g/m$^2$ of UV-curing acrylic lacquer was then roller coated onto the already applied layer after which another 20 g/m$^2$ of α-aluminium oxide particles with an average particle size of 70 μm were sprinkled on the still sticky second coating. The lacquer was then exposed to a predetermined energy amount of UV-light so that it cured only partly and the viscosity was increased. Three layers of UV-curing acrylic lacquer was then applied by roller coating with intermediate partial curing as a above. Each of the three layers had a surface weight of 20 g/m$^2$. The hard particles were completely embedded in the lacquer after the three layers were applied and a plane upper wear layer surface was achieved.

A top coating procedure was then initiated. A first layer of UV-curing acrylic topcoat lacquer was applied by means of a roller coater on top of the previous, partly cured, layers. The topcoat lacquer contained 10% by weight of hard particles of α-aluminium oxide with an average particle size of 10 μm. The first layer was applied to a surface weight of 10 g/m$^2$. The top-coat lacquer was then exposed to a predetermined energy amount of UV-light so that it cured only partly and the viscosity was increased. A second layer of the topcoat lacquer was then applied and partly cured as described above. The wear layer was then provided with a surface structure by means of a surface structured roller. A third layer of the topcoat formulation was then applied on top of the structured wear layer. Also the third layer of top coat was applied to a surface weight of 10 g/m$^2$. The wear layer was then exposed to a predetermined energy amount of UV-light so that it cured completely.

The wear layer was then tested for abrasion resistance according to ISO 4586/2-88, where an IP value of 7100 turns was obtained. An IP value of 7100 turns is fully sufficient for floor covering materials with medium to heavy traffic like hotel lobbies, hallways and the like.

EXAMPLE 2

A supporting core of medium density fibre board were sanded smooth. A layer of primer lacquer were applied on top of the fibre board. The primer were cured after which a decor was printed on top of the primer. The build up of a wear layer was then initiated by applying 30 g/m$^2$ of UV-curing acrylic lacquer by means of roller coating. 20 g/m$^2$ of hard particles made of α-aluminium oxide with an average particle size of 70 μm were sprinkled on the still sticky lacquer. The lacquer was then exposed to a predetermined energy amount of UV-light so that it cured only partly and the viscosity was increased. Another 30 g/m$^2$ of UV-curing acrylic lacquer was then roller coated onto the already applied layer after which another 20 g/m$^2$ of α-aluminium oxide particles with an average particle size of 70 μm were sprinkled on the still sticky second coating. The lacquer was then exposed to a predetermined energy amount of UV-light so that it cured only partly and the viscosity was increased. Three layers of UV-curing acrylic lacquer was then applied by roller coating with intermediate curing as a above. Each of the three layers had a surface weight of 20 g/m$^2$. The hard particles were completely embedded in the lacquer after the three layers were applied and a plane upper wear layer surface was achieved. Also the uppermost of the three layers of lacquer was cured to a desired viscosity.

A second décor layer was then printed on top of the wear layer. The second decor layer, which was identical to the first décor closest to the core, was oriented and positioned so that it completely matched the first decor.

The build up of an upper wear layer was then initiated by applying 30 g/m$^2$ of UV-curing acrylic lacquer by means of roller coating. 20 g/m$^2$ of hard particles made of α-aluminium oxide with an average particle size of 70 μm were sprinkled on the still sticky lacquer. The lacquer was then exposed to a predetermined energy amount of UV-light so that it cured only partly and the viscosity was increased. Another 30 g/m$^2$ of UV-curing acrylic lacquer was then roller coated onto the already applied layer after which another 20 g/m$^2$ of α-aluminium oxide particles with an average particle size of 70 μm were sprinkled on the still sticky second coating. The lacquer was then exposed to a predetermined energy amount of UV-light so that it cured only partly and the viscosity was increased. Three layers of UV-curing acrylic lacquer was then applied by roller coating with intermediate curing as a above. Each of the three layers had a surface weight of 20 g/m$^2$. The hard particles were completely embedded in the lacquer after the three layers were applied and a plane upper wear layer surface was achieved.

A top coating procedure was then initiated. A first layer of UV-curing acrylic topcoat lacquer was applied by means of a roller coater on top of the previous, partly cured, layers. The top-coat lacquer contained 10% by weight of hard particles of α-aluminium oxide with an average particle size of 10 μm. The first layer was applied to a surface weight of 10 g/m$^2$. The topcoat lacquer was then exposed to a predetermined energy amount of UV-light so that it cured only partly and the viscosity was increased. A second layer of the topcoat lacquer was then applied and partly cured as described above. The wear layer was then provided with a surface structure by means of a surface structured roller. A third layer of the topcoat formulation was then applied on top of the structured wear layer. Also the third layer of top coat was applied to a surface weight of 10 g/m². The wear layer was then exposed to a predetermined energy amount of UV-light so that it cured completely. The wear layer was then tested for abrasion resistance according to ISO 4586/2-88, where an IP value of 13500 turns was obtained. An IP value of 13500 turns is fully sufficient for floor covering materials with heavier traffic like airports, railway stations and the like. The second layer of décor and wear layer will add abrasion resistance without having obtained an unwanted hazy effect in the decor.

EXAMPLE 3

A supporting core of medium density fibre board were sanded smooth. A layer of primer lacquer were applied on top of the fibre board. The primer were cured after which a decor was printed on top of the primer.

The build up of a wear layer was then initiated by applying 15 g/m² of UV-curing acrylic lacquer by means of roller coating. 20 g/m² of hard particles made of α-aluminium oxide with an average particle size of 70 μm were sprinkled on the still sticky lacquer. The lacquer was then exposed to a predetermined energy amount of UV-light so that it cured only partly and the viscosity was increased. One layer of UV-curing acrylic lacquer was then applied by roller coating and was partially cured as above. The layer had a surface weight of 40 g/m². The hard particles were embedded in the lacquer after the layer of lacquer was applied and a mainly plane upper wear layer surface was achieved.

A top coating procedure was then initiated. A first layer of UV-curing acrylic topcoat lacquer was applied by means of a roller coater on top of the previous, partly cured, layers. The topcoat lacquer contained 10% by weight of hard particles of α-aluminium oxide with an average particle size of 10 μm. The first layer was applied to a surface weight of 10 g/m². The topcoat lacquer was then exposed to a predetermined energy amount of UV-light so that it cured only partly and the viscosity was increased. The wear layer was then provided with a surface structure by means of a surface structured roller. A second, final layer of the topcoat formulation was then applied on top of the structured wear layer. Also the second layer of top coat was applied to a surface weight of 10 g/m². The wear layer was then exposed to a predetermined energy amount of UV-light so that it cured completely.

The wear layer was then tested for abrasion resistance according to ISO 4586/2-88, where an IP value of 3100 turns was obtained. An IP value of 3100 turns is fully sufficient for floor covering materials with light traffic like bedrooms, living rooms and the like.

EXAMPLE 4

A supporting core of medium density fibre board were sanded smooth. A layer of primer lacquer were applied on top of the fibre board. The primer were cured after which a decor was printed on top of the primer.

The build up of a wear layer was then initiated by applying 50 g/m² of UV-curing acrylic lacquer which contained 10% by weight of hard particles of α-aluminium oxide with an average particle size of 10 μm by means of roller coating. The lacquer was then exposed to a predetermined energy amount of UV-light so that it cured only partly and the viscosity was increased.

A topcoating procedure was then initiated. A first layer of UV-curing acrylic topcoat lacquer was applied by means of a roller coater on top of the previous, partly cured, layer. The top-coat lacquer contained 10% by weight of hard particles of α-aluminium oxide with an average particle size of 10 μm. The first layer was applied to a surface weight of 10 g/m². The topcoat lacquer was then exposed to a predetermined energy amount of UV-light so that it cured only partly and the viscosity was increased. The wear layer was then provided with a surface structure by means of a surface structured roller. A second, final layer of the top-coat formulation was then applied on top of the stuctured wear layer. Also the second layer of top coat was applied to a surface weight of 10 g/m². The wear layer was then exposed to a predetermined energy amount of UV-light so that it cured completely.

The wear layer was then tested for abrasion resistance according to ISO 4586/2-88, where an IP value of 300 turns was obtained. An IP value of 300 turns could be sufficient for floor covering materials with light traffic like bedrooms, living rooms and the like.

The invention is not limited to the embodiments shown as these can be varied in different ways within the scope of the invention. It is for example possible to use so-called overlay sheets of α-cellulose impregnated with thermosetting resin instead of acrylic lacquer in the process described in connection to process scheme 1 and in particular in the process described in connection to process scheme 2. These sheets of a-cellulose which are impregnated with melamine-formaldehyde resin is joined with the supporting core through heat and pressure, whereby the resin cures. The wear resistance may also in this embodiment be improved by adding hard particles in the range 50 nm-150 μm to the wear layer.

The invention claimed is:

1. A process for forming surface elements having a decor on a surface having desired dimensions, the surface elements comprising a decorative upper surface, and a supporting core, and edges suited for joining the process comprising;
    i) selecting a main decor, the decor emanating from a group consisting of an archetype and a digitized decór;
    ii) entering dimensions of the surface to be covered by surface elements and the desired dimension of the decór into a terminal and using support programs for calculating segmentation of the decór to cover more than one surface element; and
    iii) printing the decór on the decorative upper surface of the surface elements, such that the surface elements can be assembled to reproduce the continuous decór, and
    iv) assembling the surface elements by inserting a tongue of a first surface element into a groove of a second surface element;
    wherein step ii) comprises calculating an intermediate distance, wherein the intermediate distance corresponds to a distance needed to form at least one of a tongue and a groove on the surface elements, and further comprising
    (v) forming the at least one of a tongue and a groove on an edge of at least one surface element.

2. The process of claim 1 further comprising (vi) providing edges suitable for joining on the surface elements.

3. The process of claim 2, wherein the providing step comprises forming at least one of a tongue and a groove on the edges of the surface elements.

4. The process of claim 2, wherein the providing step comprises cutting the edges.

* * * * *